United States Patent
Boydstun et al.

(10) Patent No.: US 7,334,254 B1
(45) Date of Patent: Feb. 19, 2008

(54) BUSINESS-TO-BUSINESS SECURITY INTEGRATION

(75) Inventors: Kenneth C. Boydstun, Carrollton, TX (US); Bala Balasubramanian, Irving, TX (US); Mouaz Allababidi, Arlington, TX (US); Rohit D. Janu, North Olmsted, OH (US)

(73) Assignee: Sprint Communications Company L.P., Overland Park, KS (US)

( * ) Notice: Subject to any disclaimer, the term of this patent is extended or adjusted under 35 U.S.C. 154(b) by 971 days.

(21) Appl. No.: 10/631,984

(22) Filed: Jul. 31, 2003

(51) Int. Cl.
*H04L 9/32* (2006.01)
*H04L 9/00* (2006.01)

(52) U.S. Cl. .................. 726/2; 726/1; 726/3; 726/4

(58) Field of Classification Search ............... 726/1–9, 726/11–12, 14
See application file for complete search history.

(56) References Cited

U.S. PATENT DOCUMENTS 6,981,139 B2 * 12/2005 Enokida .................. 713/156
7,185,364 B2 * 2/2007 Knouse et al. ............ 726/8

* cited by examiner

*Primary Examiner*—Hosuk Song

(57) ABSTRACT

A system for controlling access to computing resources within an enterprise. The system can consist of a web server and a web security agent controlling access to URLs, a security gatekeeper and an access server controlling access to APIs, and a core security framework used by both the web server and web security agent and the security gatekeeper and access server to store security data and policies and make security decisions. The access server can be a SOAP server. The core security framework can consist of a policy store, a data store, and a policy server, where the data store can be a relational database or a directory. A session token can be attached to an approved request for access to an API and can provide access to the API for the duration of a session.

34 Claims, 3 Drawing Sheets

BUSINESS-TO-BUSINESS SECURITY INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the authentication and authorization of users of computer systems. More particularly, embodiments of the present invention use an enterprise's internal security systems to authenticate and authorize users outside the enterprise.

BACKGROUND OF THE INVENTION

A first enterprise interacting with a second enterprise may need to request access to the second enterprise's data. In such a situation, the second enterprise would typically require that the first enterprise be authenticated and authorized by a security mechanism within the second enterprise. The second enterprise might have servers, software, and data stores dedicated solely to the authentication and authorization of such outside users. Other servers, software, and data stores within the second enterprise may be dedicated to the authentication and authorization of internal users.

SUMMARY OF THE INVENTION

An embodiment of the invention is a system for controlling access to computing resources within an enterprise. The system can consist of a web server and a web security agent controlling access to Uniform Resource Locators (URLs), a security gatekeeper and an access server controlling access to Application Programming Interfaces (APIs), and a core security framework used by both the web server and web security agent and the security gatekeeper and access server to store security data and policies and approve or deny requests for access to URLs and APIs. The access server can be a Standard Object Access Protocol (SOAP) server. The core security framework can consist of a policy store, a data store, and a policy server, where the data store can be a relational database or a directory. Upon the core security framework approving a request for access to an API, the core security framework can create a session token and attach the session token to the approved request. The session token can provide access to the API for the duration of a session.

An alternative embodiment is a system for communication between two independent computing domains. The system can consist of a security gatekeeper within the second domain, a core security framework coupled to the security gatekeeper, and an access server coupled to the security gatekeeper. The security gatekeeper can intercept an invocation from the first domain to an API in the second domain and can send security-related information in the invocation to the core security framework. The core security framework can authenticate the entity making the invocation and authorize the entity to invoke the API. The core security framework can then inform the security gatekeeper that the entity making the invocation has been authenticated and authorized. The security gatekeeper can then inform the access server that the entity making the invocation has been authenticated and authorized and the access server can provide the entity making the invocation with access to the API. The same core security framework can also be used to control access to URLs within the second domain. The communications between the first domain and the second domain can be in a format compliant with SOAP and the security gatekeeper can intercept all data transmissions from the first domain to the second domain that are in the SOAP format. The API invocation from the first domain can be a request to authenticate and authorize a user within the second domain seeking access to data within the first domain.

An alternative embodiment is a method of communicating between two independent computing domains. The method can consist of the steps of a user within the first domain sending to the second domain a SOAP-compliant data request that also contains security-related information, a security gatekeeper within the second domain intercepting the data request, the security gatekeeper sending the data request to a core security framework within the second domain, the core security framework using the security-related information in the data request to authenticate the user and authorize the user to retrieve the requested data, the core security framework returning the data request to the security gatekeeper and informing the security gatekeeper that the user has been authenticated and authorized, the security gatekeeper sending the data request to a SOAP server and informing the SOAP server that the user has been authenticated and authorized, and the SOAP server providing the user with access to the requested data. The same core security framework can also be used to control access to URLs within the second domain. The data request can be a request for access to an API within the second domain.

Another alternative embodiment is a method for a user within a first enterprise to gain access to data within a second enterprise. The method can consist of the user logging in to a secure computing domain within the first enterprise and requesting data from the second enterprise. The first enterprise can add security information to the data request and send the data request and security information to the second enterprise. A security gatekeeper within the second enterprise can intercept the security information and send it to a core security framework within the second enterprise. The core security framework can approve or deny the user's access to the requested data based on the security information, and, upon approval, the second enterprise can send the requested data to the user. The security information added to the data request can be the user ID and password that the user uses to log in to the secure computing domain within the first enterprise. Alternatively, the security information added to the data request can be a token agreed upon by the two enterprises to designate a legitimate data request from the first enterprise to the second enterprise. The data requests from the user and data returned to the user can be in a format compliant with SOAP. The data request can consist of the selection of a hyperlink on a secure web site within the first enterprise that links to a secure web site hosted by the second enterprise.

In another alternative embodiment, a user within the second enterprise can seek access to data within the first enterprise. The user can log on to a secure computing domain within the second enterprise and request data from the first enterprise. The second enterprise can add security information to the data request and send the data request and security information to the first enterprise. The first enterprise can then send the security information to the second enterprise. A security gatekeeper within the second enterprise can intercept the security information and send it to a core security framework within the second enterprise. The second enterprise's core security framework can then approve or deny the user's access to the requested data based on the security information. Upon approval, the second enterprise can inform the first enterprise that the user is allowed access to the requested data and the first enterprise can send the requested data to the user. The core security framework within the second enterprise can also be used to control access to URLs within the second enterprise.

DETAILED DESCRIPTION OF THE PREFERRED EMBODIMENTS

Users of computer systems within an enterprise (employees) and external users (customers) sometimes need access to the enterprise's data. Many enterprises have responded by placing applications and information on networks. This can provide easy, efficient access to users both inside and outside the enterprise but can expose the network and data resources to attack. Therefore, it is desirable to find secure data traffic management solutions that protect resources from unauthorized access. The degree of security placed on these resources may vary depending on the sensitivity of content and the intended user community. The challenge is to implement a secure integrated access control environment while simultaneously supporting multiple authentication and authorization mechanisms and appropriate session controls. Security management can be centralized to ease management of large numbers of user privileges and entitlements across various applications and platforms. This can be implemented by establishing a security framework within the enterprise's network. Components of such a framework can include data stores for security information, policy servers for making authentication and authorization decisions, and application servers to act as interfaces between the security framework and internal and external users.

Enterprises can create separate security frameworks for internal and external users. Internal users wishing to access secure Uniform Resource Locators (URLs) within an enterprise might be authenticated and authorized by one set of policy servers and security data stores while external users wishing to access Application Programming Interfaces (APIs) within the enterprise might be authenticated and authorized by a different set of policy servers and security data stores. Embodiments of the present invention provide a more efficient security mechanism in which a single security framework is used for the authentication and authorization of both internal and external users. A suitable security framework for dealing with internal users is first described herein and then a description of how the framework can deal with external users is provided.

Figure 1:
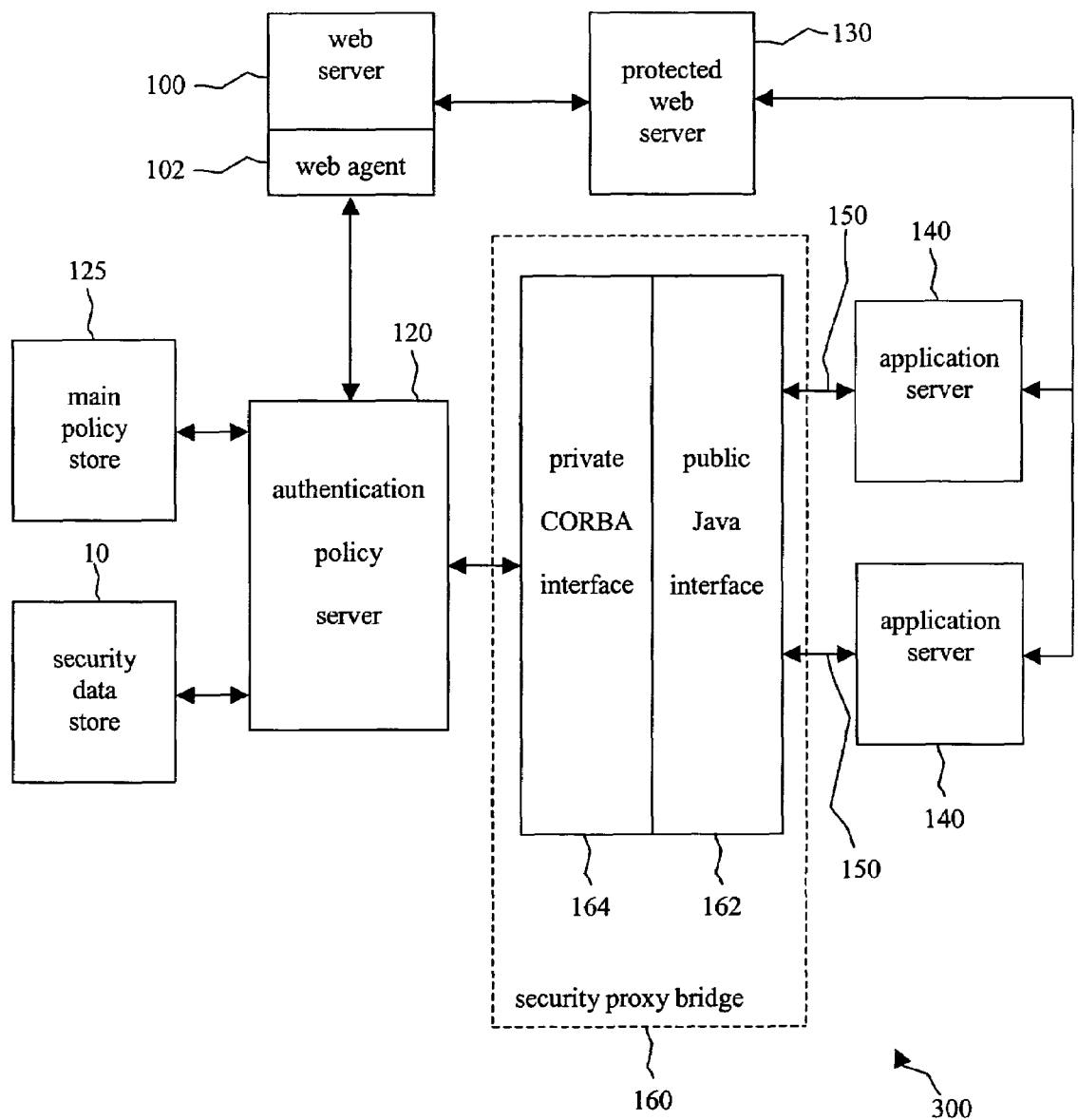
FIG. 1 is a block diagram of a security proxy framework.

In an embodiment of an internal security framework, a security proxy can act as a bridge between applications and resources by providing a mapping between objects from different platforms and/or architectures. A security proxy server is sometimes used to filter requests. For example, a company could use a proxy server to prevent its employees from accessing a specific set of protected web sites. FIG. 1 depicts a typical security proxy framework. The security proxy framework provides a method for bridging requests for access to resources between requestors in a distributed network and an authenticator servicing the distributed network. Requests for access can include requests to view, delete, add, or modify a resource. The security proxy framework 300 has a three-tier design consisting of a front-end application layer, a middle-tier bridge component, and a back-end implementation layer. The application layer comprises the application servers 140, the generic security API calls 150, and in theory includes the front-end piece of the bridging mechanism, the public Java interface 162. The middle-tier bridge (also referred to as the security proxy bridge 160) supplies the bridging mechanism within security proxy framework 300. Within the security proxy bridge 160 are a public interface to the application servers, such as public Java interface 162, and a private interface, such as private CORBA interface 164, that communicates with the back-end security framework functions. The implementation layer refers to the back-end components where security decisions, such as policy decisions, are made.

The public side of the security proxy bridge 160 includes not only the front-end side of the bridge, the public Java interface 162, that is accessed by the application servers 140, but also the generic security API calls 150. The public side can be thought of as the side of the security proxy framework 300 involved with serving the public. That is, the public, or users, access the calling application servers 140 with their requests. The private side of security proxy bridge 160 is the back-end side that functions to process the security requests. All API invocations 150 are intercepted by the public Java interface 162 within the security proxy bridge 160, which in turn calls the appropriate back-end security functions. Accordingly, the applications are isolated from the back-end implementation details. Also, addition or removal of back-end functionality will have minimum code impact on the application layer. Therefore, the security framework design has flexibility to allow future security requirements to be integrated easily with minimal impact on the application code.

Private CORBA interface 164 of the security proxy bridge 160 contains a bridging mechanism that is coded using Common Object Request Broker Architecture (CORBA). CORBA allows applications to communicate with one another no matter where they are located or who has designed them. CORBA is utilized because of its performance, stability, capacity, and cross-platform capabilities. CORBA also provides management, administration, and logging facilities. CORBA performs well in a completely heterogeneous framework. Using CORBA one can go straight from a mainframe to a web server. One can, in fact, use CORBA to do router table updates if desired.

The security proxy bridge 160 provides an insulation layer in the overall security framework. On one side of the security proxy are the application servers 140, such as personalized content servers, that sit behind the web servers 100 and 130. On the other side is a security framework data store 10. The data store can be a relational database, a directory compliant with the Lightweight Directory Access Protocol (LDAP), or another suitable type of data store.

In a typical sequence of events, a user logs on to web server 100 in order to access a web page. Web agent 102 verifies the identity of the user and allows the user access to protected web server 130. Protected web server 130 then passes the request for access to the URL of the web page to an application server 140. The application server 140 makes an API call 150 to the front end of the security proxy bridge 160. The security proxy bridge 160 sends the request to the authentication policy server 120 and an authenticator within the authentication policy server 120 handles the request from that point onward. An example of a suitable authenticator is SiteMinder, produced by Netegrity, Inc. The authentication policy server 120 requests identification and authentication information regarding the requestor from security framework data store 10 and authenticates the identity of the requestor. The authentication policy server 120 then compares the authorization policy for the requestor with the requested resource and the requested access to the requested resource, and if the comparison is successful, the authentication policy server 120 authorizes the request.

If the authentication policy server 120 is replaced at some point in the future, the requests to the security proxy bridge 160 do not have to be changed. They will still make the same generic security API calls 150. This adds flexibility to the security proxy framework 300.

Typically, large enterprises tend to build data stores combining user data. They contain multiple types of user information, both security-related information (such as user ID, passwords, and security-related secret questions) and general account-related information (such as user account number, user address, user phone number, and user billing status). A large, heterogeneous user data store such as this not only handles the security-related user data, but it also handles any policy decision information and authentication functions. Advantages of having all data stored together depend on which authentication service is in place. Some authentication services operate more efficiently when all user data, including security-related information and general account-related information, is combined into one large, heterogeneous data store. Some authentication services might only be able to operate, for proprietary reasons, when all user data is combined into one large, heterogeneous data store.

However, for some, having one large, heterogeneous user data store can create a security problem in that restricted information is mixed in with general account-related information. Then various applications requiring only general account-related information could access the user data store that also contains the restricted information, thereby creating a potential security risk. Fortunately, some authentication services allow for more flexibility as to how the data is stored than those already mentioned.

It can be a desirable feature in a security framework data storage scheme to have a completely separate security-related user data store that deals only with security-related information. Having a security-related user data store can more easily restrict users through the use of routers, security proxies, APIs, etc. Furthermore, separating security-related user information from general account-related information enables modifications to be made to either data store without affecting the other data store. From a security aspect, one can give an application the ability to allow authorized users to make changes to the security-related user data store without having to give the same authorization to all of the applications that might need access to a general store. Hence, fewer applications and/or machines will need to be provided access and more can be screened away by hardening methods. A segregated security-related user data store provides the ability to have a focused, optimized security data store that limits control and hardens it from a security standpoint.

The above-described security proxy framework is suitable for the authentication and authorization of users internal to an enterprise. In an embodiment of the invention, the same security proxy framework can be used for the authentication and authorization of external users. More specifically, the same security framework that controls the access of internal users to internal URLs is used to control the access of external users to internal APIs. The reuse of the existing security proxy framework is a more efficient use of security resources than creation and maintenance of separate security frameworks for internal and external users.

Figure 2:
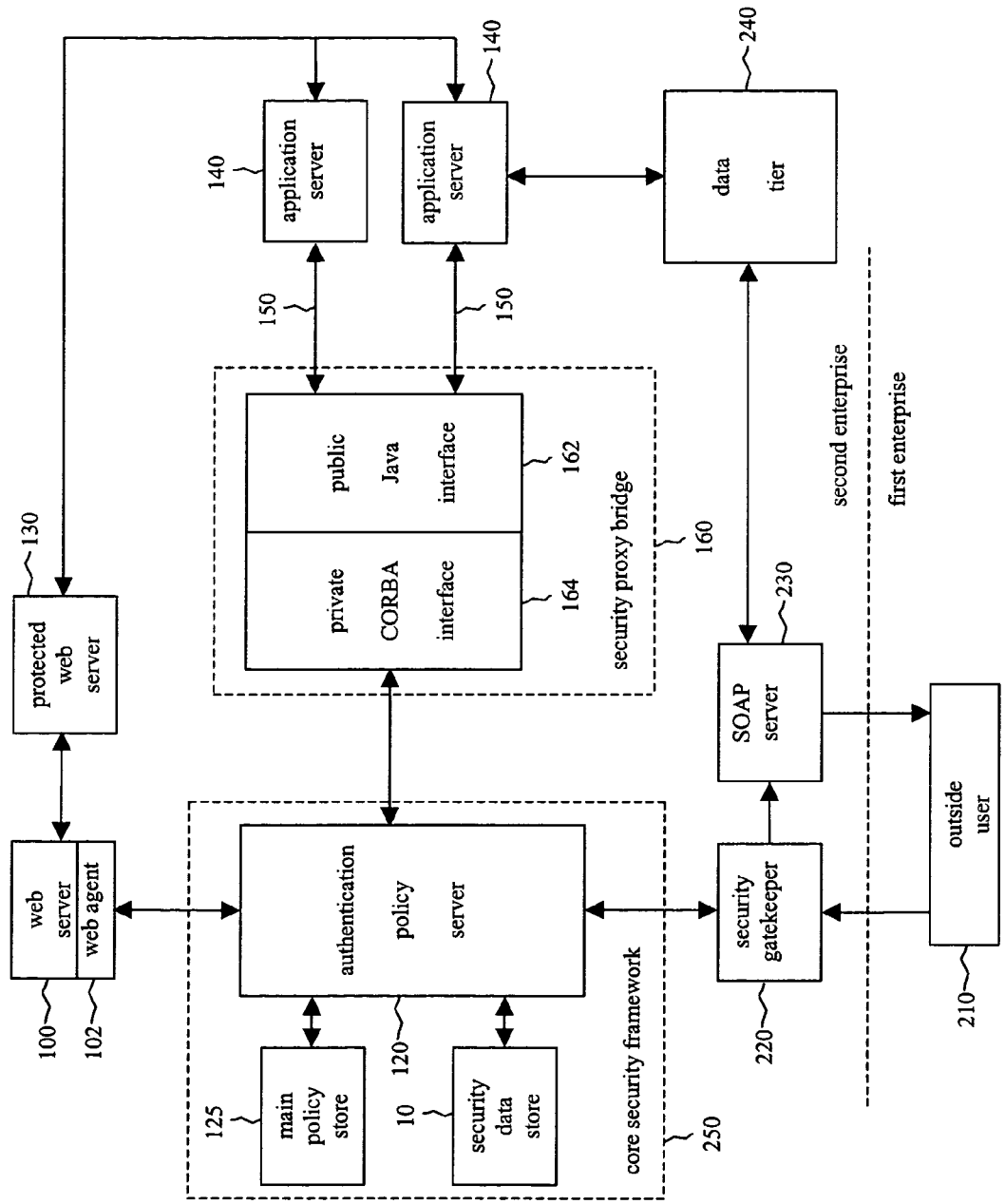
FIG. 2 is a block diagram of an authorization and authentication system incorporating a security gatekeeper.

In an example of an external user requesting access to data within another enterprise, two enterprises might enter an agreement in which the first enterprise is allowed access to the APIs within the second enterprise. By exposing its internal APIs, the second enterprise can provide the first enterprise with direct access to data stores, mainframe computing systems, and other components of a data tier within the second enterprise. When the first enterprise or computing domain sends a request to the second enterprise or computing domain for secure data within the second enterprise, the second enterprise typically reviews the security information (such as a user ID and a password) provided by the first enterprise and determines if the first enterprise is authorized to receive the requested data. The second enterprise might request the security information and authenticate and authorize the first enterprise each time the first enterprise requests secure data. Alternatively, the second enterprise might request the security information and authenticate and authorize the first enterprise only one time and then create a session token that allows the first enterprise access to selected data for the duration of a session. An embodiment of a system and method for allowing session-based access such as this is shown in FIG. 2. In this embodiment, elements of the security proxy framework described above and illustrated in FIG. 1 are used.

The session-based access process begins when a member of a first enterprise, shown in FIG. 2 as outside user 210, requests data from a second enterprise. The data request would typically be a call to an API within the second enterprise and would typically be in a format such as XML or SOAP (Simple Object Access Protocol). The most recent version of the SOAP protocol can be found in the W3C Working Draft of the SOAP version 1.2 specification, which is incorporated herein by reference. In addition to specifying the data that is needed, the data request would also typically include security information regarding the outside user 210. A security gatekeeper 220 within the second enterprise intercepts the data request and passes the data request and security information to a core security framework 250. The core security framework 250 typically comprises an authentication policy server 120, a security data store 10, and a main policy store 125. Policies regarding the criteria needed to create a session, session durations, the types of data that can be retrieved during a session, and other session-related parameters can be stored in the data store 10 or the main policy store 125. Upon receiving security information from the security gatekeeper 220, the authentication policy server 120 calls its security data store 10 to check authentication and policy information on outside user 210. The data store 10 returns data regarding the authenticity and authority of the outside user 210 to the authentication policy server 120. The authentication policy server 120 then decides if the outside user 210 is authentic and is authorized to receive the requested data. If the outside user 210 is authorized, the authentication policy server 120 creates a session token, attaches it to the data request, and returns its decision to the security gatekeeper 220. The security gatekeeper 220 then informs an access server that the outside user 210 is allowed to have the requested information. In the embodiment of FIG. 2, the access server is a SOAP server 230 but other types of application servers that perform similar functions could be used. Upon being informed by the security gatekeeper 220 that the outside user 210 is authorized to receive the requested data, the SOAP server 230 requests the data from a data tier 240. The data tier typically includes data storage and computing components such as relational databases, data directories, and mainframe computing systems. The data tier 240 returns the requested data to the SOAP server 230 and the SOAP server 230 returns the data to the outside user 210. As long as the session token allows the session to remain active, the SOAP server 230 is allowed to transfer data directly from the data tier 240 to the outside user 210 without the need for further authentication and authorization or further intervention from the security gatekeeper 220 or the authentication policy server 120.

Under this arrangement, the core security framework 250 controls the access outside users 210 are allowed to have to the APIs within the second enterprise. As discussed above, the core security framework 250 also controls the access web servers 100 are allowed to have to URLs within the second enterprise. Thus, the same core security framework provides both API protection and URL protection. The use of the existing authentication and authorization mechanisms within the security proxy framework reduces the effort and infrastructure needed to deal with outside users. Instead of creating new policies and new data stores to handle outside users and placing the policies and data stores on dedicated servers, an enterprise can simply add outside users to existing policies, data stores, and servers.

In an alternative embodiment, a security gatekeeper and a core security framework can be used to allow an enterprise to bypass the login screen typically displayed when an attempt is made to reach a secure web site within another enterprise. Two alternatives exist under this embodiment. In one, a first, or external, enterprise as described above attempts to reach a secure web site within a second enterprise containing a security gatekeeper and a core security framework as described above. In this case, a user logged on to a secure web site hosted by the first enterprise might select a hyperlink that links to a secure web site hosted by the second enterprise. Traditionally, the second enterprise would present the user with a login page that requests security information to verify that the user is allowed access to the second enterprise's secure web site. However, the two enterprises might wish to enter an arrangement in which this login page is bypassed and the user is taken directly to the requested web site. This can be accomplished by the two enterprises having pre-arranged policies that allow security information to be transmitted from the first enterprise to the second enterprise when certain hyperlinks from the first enterprise to the second enterprise are selected. When a user within the first enterprise selects one of these hyperlinks, the first enterprise can add security information to the request for access to the secure web site and then send both the access request and the security information to the second enterprise. The security gatekeeper within the second enterprise can intercept the security information and send the security information to the core security framework. The core security framework can then approve or deny the user's access to the secure web site based on the security information. If access is allowed, the user can be taken directly to the web site, bypassing the second enterprise's normal login page.

In the other alternative, a user within the second enterprise, which contains the security gatekeeper and the core security framework, attempts to reach a secure web site within the first, or external, enterprise. In this case, a user logged on to a secure web site hosted by the second enterprise might select a hyperlink that links to a secure web site hosted by the first enterprise. The second enterprise can add security information to the request for access to the secure web site and then send both the access request and the security information to the first enterprise. The first enterprise can then send the security information to the second enterprise. The security gatekeeper within the second enterprise can intercept the security information and send the security information to the core security framework. The core security framework can then approve or deny the user's access to the secure web site based on the security information. Upon approval, the second enterprise can inform the first enterprise that the user is allowed access to the secure web site. The user can then be taken directly to the web site, bypassing the first enterprise's normal login page.

In either of the alternatives, the security information sent from one enterprise to the other enterprise can be a user ID and password or other information pertaining to the specific user making the request. In this way, the security information a user submits when logging on to a web site within one enterprise can be used to automatically log the user on to a web site within the other enterprise and bypass the other enterprise's login page. Alternatively, the security information can be a token that the two enterprises have mutually agreed one enterprise will send when it requests access to certain web sites within the other enterprise. If the first enterprise is seeking access to a secure web site within the second enterprise, the first enterprise sends the access request and token to the second enterprise. The security gatekeeper within the second enterprise intercepts the token and sends it to the core security framework. The core security framework verifies that the token is legitimate and displays the requested web site to the user without the display of a login page. If the second enterprise is seeking access to a secure web site within the first enterprise, the second enterprise sends the access request and token to the first enterprise, which then sends the token to the second enterprise. The security gatekeeper within the second enterprise intercepts the token and sends it to the core security framework. The core security framework verifies that the token is legitimate and the second enterprise informs the first enterprise that the user is allowed access to the first enterprise's web site. The first enterprise then displays the requested web site to the user without the display of a login page. The use of a token can allow multiple users in one enterprise to have direct access to web sites within the other enterprise without the need to verify the security credentials of each of the users individually.

Figure 3:
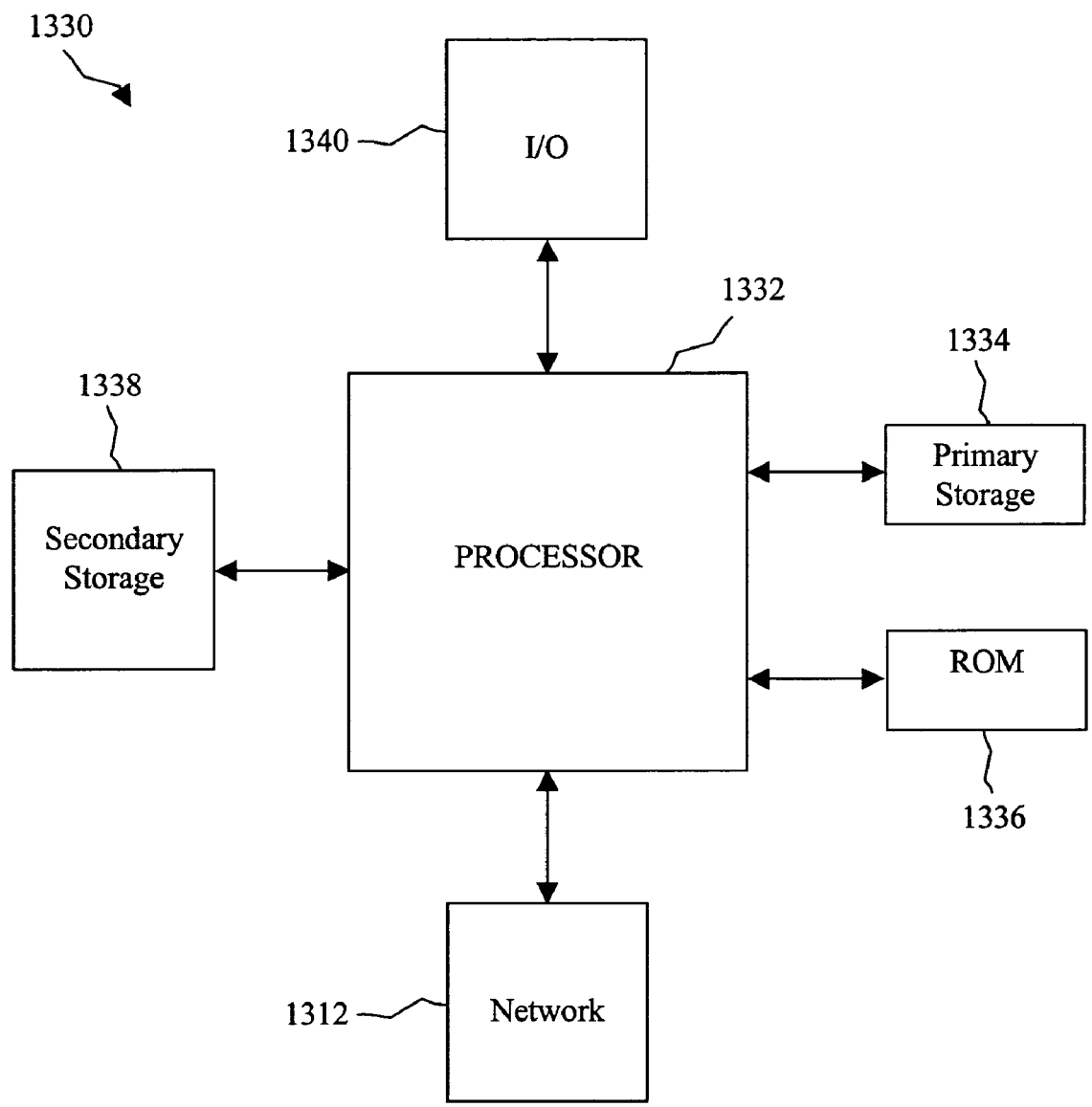
FIG. 3 is a diagram of a typical, general-purpose computer system suitable for implementing the present invention.

An authentication and authorization system as described above may generally be implemented on a variety of different computer systems. FIG. 3 illustrates a typical, general-purpose computer system suitable for implementing the present invention. The computer system 1330 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1336 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A system for controlling access to computing resources within an enterprise comprising:

a web server and a web security agent controlling access to Uniform Resource Locators (URLs);

a security gatekeeper and an access server controlling access to Application Programming Interfaces (APIs); and a core security framework used by both the web server and web security agent and by both the security gatekeeper and the access server to store security data and policies and approve or deny requests for access to URLs and APIs, wherein the security gatekeeper sends a data request made by a user with security related information to the core security framework to authenticate the user and to authorize the user, wherein the core security framework informs the security gatekeeper whether the user has been authenticated and authorized, wherein the security gate keeper forwards the data request to the access server when the security gate keeper is informed that the user has been authenticated and authorized, the access server provides the user with the requested data.

2. The system of claim 1 wherein the access server is a Standard Object Access Protocol (SOAP) server.

3. The system of claim 1 wherein the core security framework comprises a policy store, a data store, and a policy server.

4. The system of claim 3 wherein the data store is a relational database.

5. The system of claim 3 wherein the data store is a directory.

6. The system of claim 1 wherein, upon the core security framework approving a request for access to an API, the core security framework creates a session token and attaches the session token to the approved request, the session token providing access to the API for the duration of a session.

7. A system for communication between two independent computing domains comprising:

a security gatekeeper within the second domain to intercept an invocation from the first domain to an API in the second domain;

a core security framework coupled to the security gatekeeper wherein the security gatekeeper sends security-related information in the invocation to the core security framework, the core security framework authenticates an entity making the invocation and authorizes the entity to invoke the API, and the core security framework informs the security gatekeeper that the entity making the invocation has been authenticated and authorized; and an access server coupled to the security gatekeeper wherein the security gatekeeper informs the access server that the entity making the invocation has been authenticated and authorized and the access server provides the entity making the invocation with access to the API;

wherein the core security framework is also used to control access to URLs within the second domain.

8. The system of claim 7 wherein the core security framework comprises a policy store, a data store, and a policy server.

9. The system of claim 8 wherein the data store is a relational database.

10. The system of claim 8 wherein the data store is a directory.

11. The system of claim 7 wherein a session token is created that provides an entity invoking an API with access to the API for the duration of a session.

12. The system of claim 7 wherein communications between the first domain and the second domain are in a format compliant with SOAP.

13. The system of claim 12 wherein the security gatekeeper intercepts all data transmissions from the first domain to the second domain that are in the SOAP format.

14. The system of claim 7 wherein the API invocation from the first domain is a request to authenticate and authorize a user within the second domain seeking access to data within the first domain.

15. A method of communicating between two independent computing domains comprising:
a user within the first domain sending to the second domain a SOAP-compliant data request that also contains security-related information;
a security gatekeeper within the second domain intercepting the data request;
the security gatekeeper sending the data request to a core security framework within the second domain;
the core security framework using the security-related information in the data request to authenticate the user and authorize the user to retrieve the requested data;
the core security framework returning the data request to the security gatekeeper and informing the security gatekeeper that the user has been authenticated and authorized;
the security gatekeeper sending the data request to a SOAP server and informing the SOAP server that the user has been authenticated and authorized; and
the SOAP server providing the user with access to the requested data;
wherein the core security framework is also used to control access to URLs within the second domain.

16. The method of claim 15 wherein the data request is a request for access to an API within the second domain.

17. The method of claim 15 wherein the core security framework comprises a policy store, a data store, and a policy server.

18. The method of claim 17 wherein the data store is a relational database.

19. The method of claim 17 wherein the data store is a directory.

20. The method of claim 15 wherein a session token is created that provides the user with access to the requested data for the duration of the session.

21. The method of claim 15 wherein data requests from the user and data returned to the user are in a format compliant with SOAP.

22. The method of claim 21 wherein all data transmissions from the first domain to the second domain that are in the SOAP format are intercepted by the security gatekeeper.

23. The method of claim 15 wherein the data request from the first domain is a request to authenticate and authorize a user within the second domain seeking access to data within the first domain.

24. A method for a user within a first enterprise to gain access to data within a second enterprise comprising:
the user logging in to a secure computing domain within the first enterprise;
the user requesting data from the second enterprise;
the first enterprise adding security information to the data request and sending the data request and security information to the second enterprise;
a security gatekeeper within the second enterprise intercepting the security information;
the security gatekeeper sending the security information to a core security framework within the second enterprise;
the second enterprise's core security framework approving or denying the user's access to the requested data based on the security information; and
upon approval, the second enterprise sending the requested data to the user.

25. The method of claim 24 wherein the security information added to the data request is the user ID and password used by the user to log in to the secure computing domain within the first enterprise.

26. The method of claim 24 wherein the security information added to the data request is a token agreed upon by the two enterprises to designate a legitimate data request from the first enterprise to the second enterprise.

27. The method of claim 24 wherein data requests from the user and data returned to the user are in a format compliant with SOAP.

28. The method of claim 24 wherein the data request comprises the selection of a hyperlink on a secure web site within the first enterprise that links to a secure web site hosted by the second enterprise.

29. A method for a user within a second enterprise to gain access to data within a first enterprise comprising:
the user logging in to a secure computing domain within the second enterprise;
the user requesting data from the first enterprise;
the second enterprise adding security information to the data request and sending the data request and security information to the first enterprise;
the first enterprise sending the security information to the second enterprise;
a security gatekeeper within the second enterprise intercepting the security information;
the security gatekeeper sending the security information to a core security framework within the second enterprise;
the second enterprise's core security framework approving or denying the user's access to the requested data based on the security information;
upon approval, the second enterprise informing the first enterprise that the user is allowed access to the requested data; and
the first enterprise sending the requested data to the user.

30. The method of claim 29 wherein the security information added to the data request is the user ID and password used by the user to log in to the secure computing domain within the second enterprise.

31. The method of claim 29 wherein the security information added to the data request is a token agreed upon by the two enterprises to designate a legitimate data request from the second enterprise to the first enterprise.

32. The method of claim 29 wherein data requests from the user and data returned to the user are in a format compliant with SOAP.

33. The method of claim 29 wherein the core security framework is also used to control access to URLs within the second enterprise.

34. The method of claim 29 wherein the data request comprises the selection of a hyperlink on a secure web site within the second enterprise that links to a secure web site hosted by the first enterprise.

* * * * *